Jan. 20, 1959  L. R. MURPHY  2,869,855
EXTENSIBLE SCALE PLATFORM FOR WEIGHING TRUCKS AND THE LIKE
Filed June 5, 1957  3 Sheets-Sheet 1

INVENTOR.
LESLIE R. MURPHY
BY
ATTORNEY.

Jan. 20, 1959    L. R. MURPHY    2,869,855
EXTENSIBLE SCALE PLATFORM FOR WEIGHING TRUCKS AND THE LIKE
Filed June 5, 1957    3 Sheets-Sheet 2
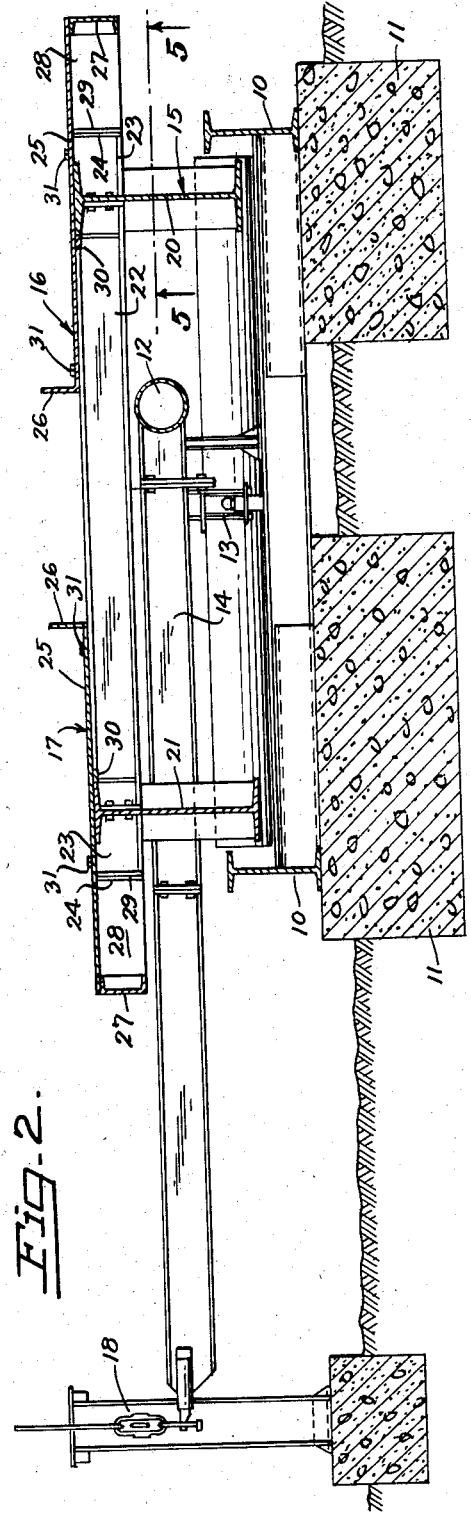
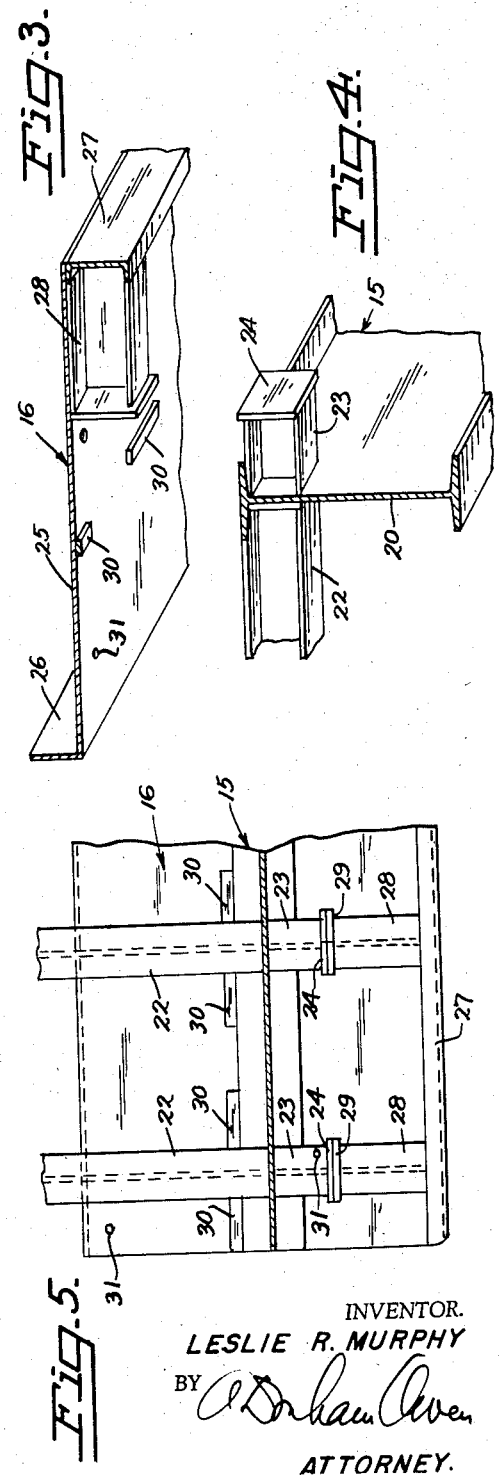
INVENTOR.
LESLIE R. MURPHY
BY
ATTORNEY.

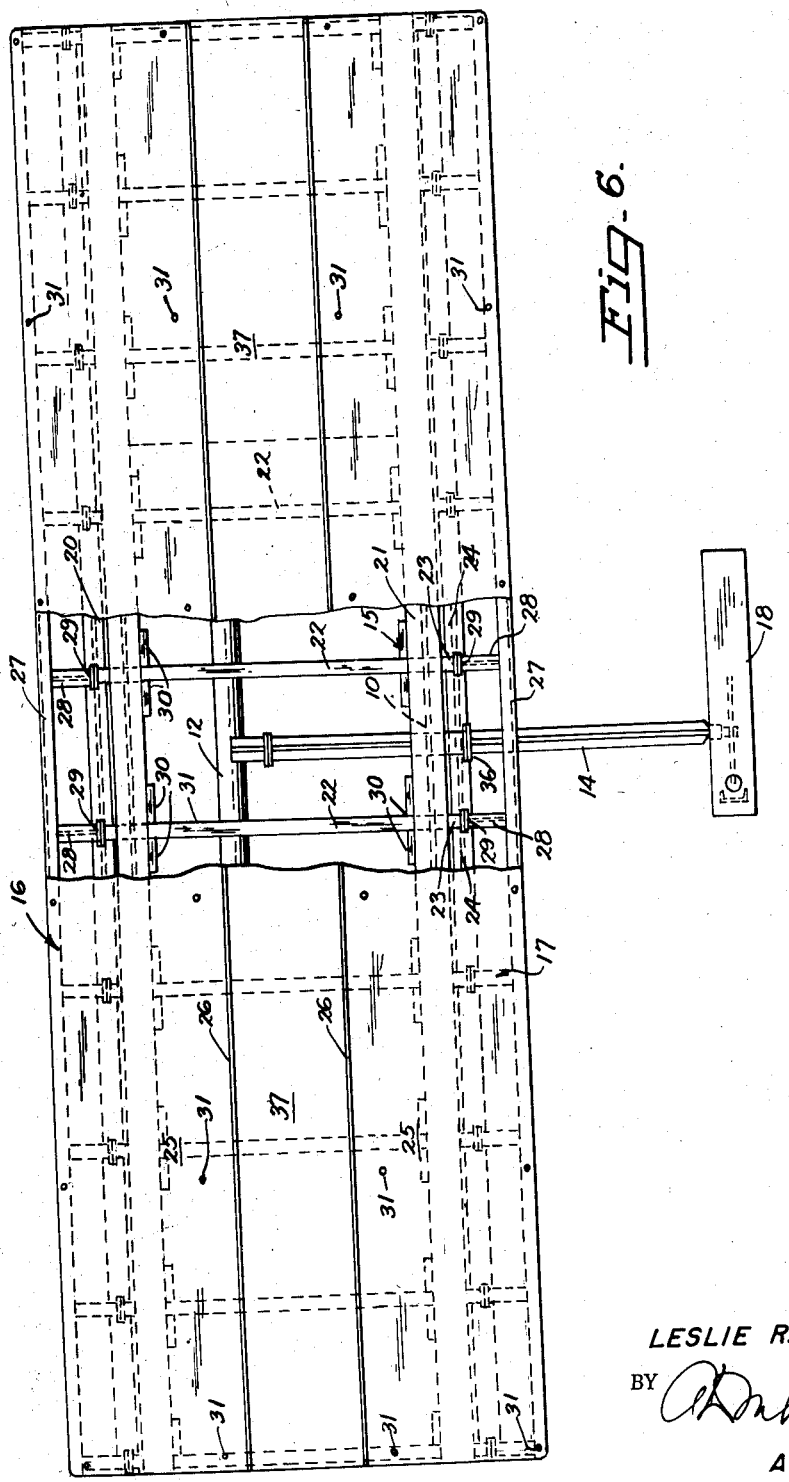

United States Patent Office 2,869,855
Patented Jan. 20, 1959

2,869,855

EXTENSIBLE SCALE PLATFORM FOR WEIGHING TRUCKS AND THE LIKE

Leslie R. Murphy, Sacramento, Calif., assignor to L. R. Murphy Scale Company, Sacramento, Calif., a corporation of California Application June 5, 1957, Serial No. 663,743

6 Claims. (Cl. 265—71)

This invention relates to improvements in transportable scales for weighing motor trucks and the like.

Heavy-duty transportable scales are difficult to provide, because a scale wide enough for a large truck, coming barely within the highway width-limit, to be driven on the scale and weighed, will by mere virtue of the fact be too wide for legal highway transport. For example, suppose that the legal highway width is eight feet. That means that many trucks, particularly contractor's trucks, which have to be weighed when loaded, will actually measure eight feet wide from the outside of the wheel at one side to the outside of the wheel at the other side. Therefore, a scale on which such trucks can drive must have a platform wider than eight feet. As a rule the platform should be at least a foot wider on each side, making the scale at least ten feet wide. However, when the time comes to transport such a scale as this, the width must in some manner be reduced from ten feet or more down to no greater than eight feet, or else it cannot be transported on the highway.

Similar factors hold true for the different specific widths of loads that are permitted in various states, and the same general factors hold true of scales that are transported on rail cars and the like, where there is also a standard width that must be maintained. Similar factors hold true on scales which are transported off the highways and are used for weighing oversize trucks which themselves are to pull the scales. Even then, clearances must be watched. In each case it is desirable to have some way to extend the width of the scale when weighing and to reduce the width when transporting the scale.

The present invention provides an interesting and novel solution to this problem, comprising a scale whose width can be extended at the weighing station and can be narrowed for transport.

A problem which had to be solved for successful operation of such a scale is how to support the overhang of the scale platform. The rigid frame comprising the weighbridge cannot be the full maximum width, nor can the weighbridge itself be extensible, because if it were, it would not have the required rigidity and strength and would not properly transmit the load to the scale lever system. The present invention provides an extensible scale platform, comprising two separate pieces that rest on the weighbridge and can be moved toward each other to condense the width or away from each other to extend the width of the platform. If the scale platform is extensible and overhangs the weighbridge, as is true in the present invention, the problem then arises as to how to keep the overhung portion from bending under the tremendous weights to which it is subjected. Even though checkered steel plate is a relatively strong material, it bends readily enough under the weight of many tons that these scales are intended to weigh. If the platform were made of rigid material that could withstand these weights, the scale would no longer be transportable.

In other words, some way had to be found to support the rather lightweight steel plate, from which the platform is made, so that it would not bend over when a truck drove onto a part of it that overhung the weighbridge. As has been said before, the weighbridge itself cannot be extensible along with the platform. The present invention, therefore, is directed particularly to the solution of the problem of an extensible weighing platform with adequate support for the portion that overhangs the weighbridge.

The invention solves this problem, partly by providing for very strong support members welded to the lower surface of the checkered steel platform members and bearing against the rigid frame of the weighbridge. Thus, although the checkered steel platforms are made removable from the weighbridge supporting frame, these strong structural members give the overhanging portions direct support. On the other side of a structural member of the weighbridge, such as an I-beam girder, shear plates are welded to the lower surface of the checkered steel platform. The result is that a compression joint is provided, which means that any pressure placed on the overhanging portion of the platform is resolved through a structural member bearing directly and snugly against the weighbridge frame, while the shear plate member prevents rotation of the platform relative to the weighbridge. In other words, the checkered steel platform is saved from bending by the fact that the downward forces are resolved directly into the structural steel frame, and the only force resolved by the steel plate platform is a stretching force, well within its tensile strength. The resolution of forces eliminates the bending moments.

Other objects and advantages of the invention will appear from the following description of a preferred embodiment thereof.

In the drawings:

Fig. 2 is a view in elevation and in vertical cross section of the scale of Fig. 1 mounted on the ground and prepared for weighing. The platform members are shown in their extended position overhanging the weighbridge.

Fig. 3 is a view in perspective and in section of a portion of one of the two scale platform members, looking from beneath.

Fig. 4 is a similar view in perspective and in section of a portion of the weighbridge frame. Figs. 3 and 4 are so related that they correspond to a single expoded view of the portions they show.

Fig. 5 is a bottom plan view of a portion of the scale platform and weighbridge frame, showing the relative mounting of the two members.

Fig. 6 is a top plan view of the scale with portions broken away in order to show some of the lever system and frame members therebeneath.

Figure 1:
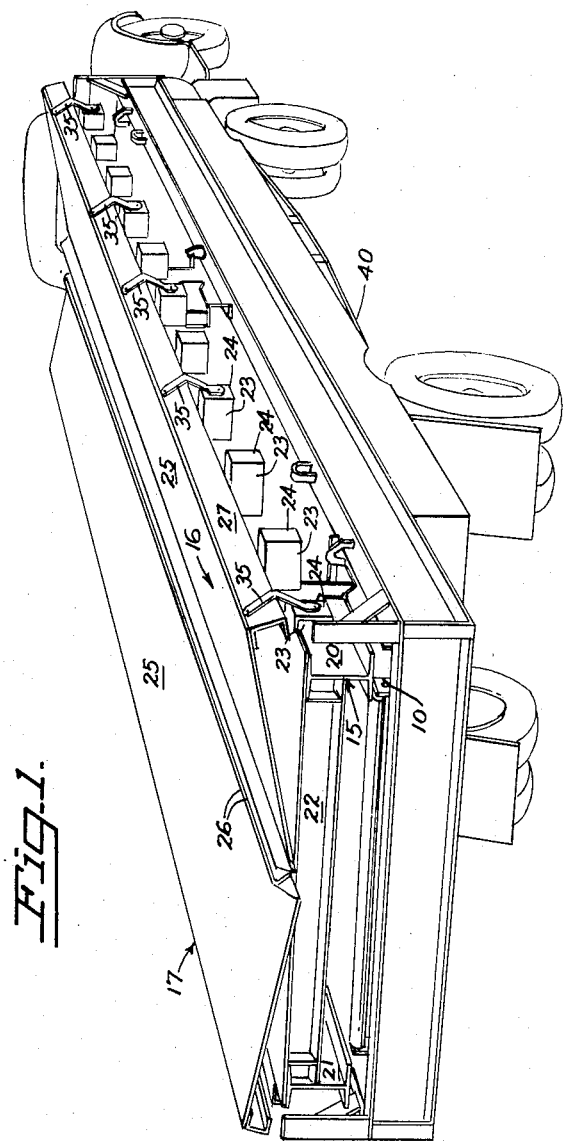
Fig. 1 is a view in perspective showing a transportable scale embodying the principles of the present invention and mounted upon a large transport truck with the scale platform moved to its transporting position.

Although it is transportable, as shown in Fig. 1, the scale is designed for heavy duty weighing, and when set up, as shown in Fig. 2, its base 10 is preferably supported on a suitable footing 11. By a suitable suspension system of a type well known in the art and only rudimentarily indicated in the drawings (it includes levers 12, 13 and 14), the base 10 supports a weighbridge 15 on which rest a pair of weighing platform members 16 and 17. This invention is concerned chiefly with the connection and cooperation between the weighbridge 15 and the platform members 16 and 17. The purpose of the platform members 16 and 17 is to provide a surface on which the trucks can be driven when they are to be weighed and to transmit the load evenly to the weighbridge 15. The weighbridge 15, in turn, when depressed by the load, transmits the force through the levers 12, 13, and 14 so as to actuate a suitable lever-indicating system 18 shown at the left of Fig. 2 and at the bottom of Fig. 6. There, weighbeams or dial units or other indicating devices may be supplied.

As shown in the drawings, the weighbridge 15 preferably incorporates two very strong, heavy I-beams or girders 20, 21 disposed longitudinally of the scale and parallel to each other and connected together at various points by suitable laterally-extending structural members 22. To the outer side of the I-beams 20 and 21 are welded, at intervals, suitable short I-beam extension members 23, the ends of which are provided with steel pads 24. The distance between the pads 24 corresponds approximately to the legal width of the road. In other words where eight feet is the legal width, the pads 24 lie approximately eight feet apart, the girders 20 and 21 lying just slightly less than eight feet apart. For convenience, as will be seen, the extension members 23 preferably align with the cross members 22, though this is not absolutely necessary.

Each platform 16, 17 preferably comprises a deck 25 made of a long strip of checkered steel plate (which may be thin, e. g., ¼" or 5/16" thick, more or less), made of a long strip of checkered steel plate usually in lengths of approximately ten or twelve feet, and provided along the inner edge with an upstanding flange 26, adapted to prevent the wheels of a truck to be weighed from driving off the platforms 16, 17. To the lower surface of the deck 25 and along its outer edge is welded a steel structural member 27 such as a channel beam or other girder. At intervals corresponding to the intervals of the extension beams 23 and their pads 24 are provided laterally-extending structural members 28, such as the I-beams shown shown in the drawings. These members 28 are carefully welded by a complete weldment to the lower surface of the checkered steel deck 25 as well as to the channel 27, and they are cut exactly to fit so that pads 29, which are welded to them, abut the pads 24 of the beams 23 when the platforms 16 and 17 are in their proper position for weighing. The tolerances for this operation are made very small, each one being fit individually, so that the pads 24 and 29 abut very snugly.

The platforms 16 and 17 are also provided with a series of shear plates 30 welded to the lower surface of the deck 25 at carefully calculated locations. In practice, it may be preferable to weld the shear plates 30 in place before welding the steel I-beams 28 to the deck 25, so that the exact proper length of the I-beams 28 can be ascertained. When installed, as shown in Fig. 5, each shear plate 30 bears directly against the inner edge 31 of a main I-beam 20 or 21, while the pads 29 on the platform members 28 bear directly against the pads 24 on the weighbridge members 23, which are on the opposite side of the main I-beam 20 or 21. Also, the shear plates 30 are preferably provided in pairs on opposite sides of the cross members 22 and engage them to prevent lengthwise movement of the platforms 16, 17 relative to the weighbridge 15.

The distances are very carefully measured, and the welding is usually done directly in place with each individual beam 28 fitted thereto to get an exact fit. This makes it possible to provide a compression joint between the shear plates 30 and the I-beams 28 on the one hand and the weighbridge I-beams 20, 21 and its side extensions 23 on the other. In other words, any force tending to bend the platforms 16 and 17 down, acts merely to tighten the compression between the platform I-beam pads 29 and the weighbridge I-beam pads 24, while the shear plates 30 engage the main I-beams 20 and 21 and prevent any degree of rotation. By providing a very careful fit, there is no rotation or bending when the scale is in use, even under very heavy loads and even when the truck is badly centered on the platform. Of course, the installed platforms 16, 17 are secured to the weighbridge 15 by bolts 31.

The space between the two platform members 16, 17 is sufficient to provide for an amount corresponding to the overhang. This means that when the scale is to be transported, as shown in Fig. 1, the bolts 31 are removed and the platform members 16, 17 are simply lifted and moved over on top of the weighbridge 15. There, suitable brackets 35 may hold the platforms 16, 17 in place. One end of each bracket 35 may be bolted to a pad 24 and the other end may be secured to the platform longitudinal beam 27; so there is no tendency for the platform members 16, 17 to slip off during the transport period. A sufficient number of these brackets or clips 35 are provided to take care of the situation concerned. This means that the scale is easily transported, since the width of the weighbridge 15 is within the legal load limit. Of course, the lever arm 14 is made in two pieces joined at the bolted connection 36, so that it and the indicator mechanism 18 are also disconnected. They may be transported atop the platform 16, 17 or as desired.

When the scale has been transported to the place where it is wanted, it is unloaded and its base 10 placed on suitable footings 11 or on the ground. A derrick or any other device may be used for loading and unloading. The brackets 35 are removed, and then the platforms 16 and 17 are lifted and set down over the weighbridge 15 with their shear plates 30 engaging the weighbridge beams 20 and 21 and bridging the cross members 22, while the pads 29 engage the pads 24. The disposition of the shear plates 30 in pairs and the alignment of the cross members 22 and extension members 23 hastens this action and guarantees accurate alignment. Then the bolts 31 are put in, the lever arm 14 and indicator 18 connected, and the scale is ready for weighing. As shown in Fig. 6, it is preferable usually to put planks 37 in between the flanges 26 to prevent people from falling down into the scale inadvertently when they walk across it.

Once the scale has been set up, its lever system and indicators 18 are in place, the same truck 40 which transported it, or one like it, may drive up onto the two platform members 16 and 17 and be weighed. Even if the truck is not perfectly centered, the fact that its wheel may be over the overhang still causes no trouble because of the compression joint provided by the shear plates 30 on one hand and the structural I-beam members 28 on the other hand bearing against the main I-beam 20, 21 and its extension members 23 and pads 24. As a result, when the truck is on the platform 16, 17, it depresses the weighbridge 15 relative to the main base 10, a given force is exerted on the lever system, and this is transmitted through the various levers to the scale-indicating means 18.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A transportable scale comprising a base frame; a weighbridge supported on said base frame by a lever system, said weighbridge having a rigid frame including longitudinal side girders; and a pair of steel plate platforms releasably supported on said weighbridge, spaced apart from each other and overhanging said girders at the sides, the overhanging portion of each platform member having structural means welded to its lower surface and bearing against said weighbridge on one side of a said side girder, each platform also having a plurality of shear plates welded to its lower surface and bearing against the opposite side of said side girder.

2. A transportable scale comprising a base frame; a weighbridge supported on said base frame by a lever system, said weighbridge having parallel longitudinal side girders connected by cross members; and a pair of steel plate platforms releasably supported on said weighbridge, spaced apart from each other and overhanging said girders at the sides, the overhanging portion of each platform member having a longitudinal structural member welded to its lower surface and laterally extending structural members welded to said lower surface and to said longitudinal member and bearing against portions of said weighbridge on one side of a said girder, each platform also having a plurality of shear plates welded to its lower surface and bearing against the opposite side of said girder.

3. A weighing platform for a transportable scale comprising a rigid weighbridge having parallel longitudinal side girders connected by cross members; and a pair of steel plate platforms releasably supported on said weighbridge, spaced apart from each other and overhanging said girders at the sides, the overhanging portion of each platform member having a longitudinal structural member welded to its lower surface, laterally extending structural members welded to said lower surface and to said longitudinal member and bearing against portions of said weighbridge on one side of a said girder, and a plurality of shear plates welded to its lower surface and bearing against the opposite side of said girder.

4. A transportable scale comprising a base frame; a lever system supported on said base frame; a weighbridge supported on said weighing levers, said weighbridge being generally rectangular and having parallel longitudinal girders of heavy structural steel connected by cross members and with lateral beams extending outwardly therefrom; a pair of platform members releasably supported on said weighbridge and spaced apart from each other and overhanging said side members, each platform member comprising a flat steel plate with a lower surface, a longitudinal girder welded to said lower surface beneath its side edges, laterally inwardly extending beams welded to said platform girder and said lower surface and bearing against said weighbridge beams, and, spaced apart from said laterally inwardly extending beams, a series of shear plates welded to said lower surface and bearing against the inner edge of said weighbridge girder.

5. A transportable scale comprising a base frame; a lever system supported on said base frame; a weighbridge supported on said weighing levers, said weighbridge being generally rectangular and having parallel longitudinal girders of heavy structural steel connected by cross members and with lateral beams extending outwardly therefrom and terminating in pads; a pair of platform members releasably supported on said weighbridge and spaced apart from each other and overhanging said side members, each platform member comprising a flat steel plate with a lower surface, a longitudinal girder welded to said lower surface beneath its side edges, laterally inwardly extending beams welded to said platform girder and said lower surface and terminating in pads bearing against the pads on said weighbridge beams, and, spaced apart from said platform pads, a series of pairs of shear plates welded to said lower surface and bearing against the inner side of said weighbrdige girder and on opposite sides of said cross members, whereby a compression joint is provided with the force tending to bend the overhang being resolved through the abutting pads, and rotation of said plate being prevented by said shear plates.

6. A transportable scale comprising a base frame; a lever system supported on said base frame; a weighbridge supported on said weighing levers, said weighbridge being generally rectangular and having parallel longitudinal girders of heavy structural steel connected by cross members and with lateral beams extending outwardly therefrom in alignment with said cross members and terminating in pads; a pair of checkered steel plate platforms bolted to said weighbridge and spaced apart from each other and overhanging said side members, the total overhang being no greater than their spacing apart from each other, each platform having welded by continuous weldments to its lower surface, a longitudinal girder beneath its side edges, laterally inwardly extending beams terminating in pads bearing against the pads on said weighbridge beams, and, spaced apart from said platform pads, a series of pairs of shear plates bridging said cross members and bearing against the inner side of said weighbridge girder, whereby a compression joint is provided with the force tending to bend the overhanging portions of said platforms being resolved through the abutting pads and rotation of said plate being prevented by said shear plates and whereby said platforms may be unbolted from said weighbridge and moved against each other for transport so as to be no wider than said weighbridge.

References Cited in the file of this patent

UNITED STATES PATENTS

| | | |
|---|---|---|
| 1,167,311 | Moore et al. | Jan. 4, 1916 |
| 2,077,495 | Sykes | Apr. 20, 1937 |